Sept. 17, 1929.  S. H. RAY  1,728,253

RIM LOCKING DEVICE

Filed Nov. 4, 1926  2 Sheets-Sheet 1

Witnesses:
C. E. Wessels

Inventor:
Samuel H. Ray,
By Joshua R. H. Potts
his Attorney.

Sept. 17, 1929.　　　　S. H. RAY　　　　1,728,253
RIM LOCKING DEVICE
Filed Nov. 4, 1926　　　2 Sheets-Sheet 2
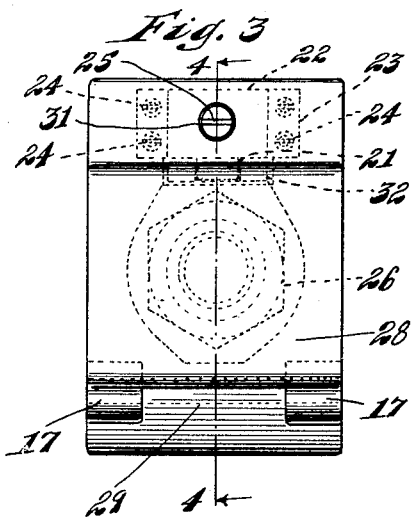
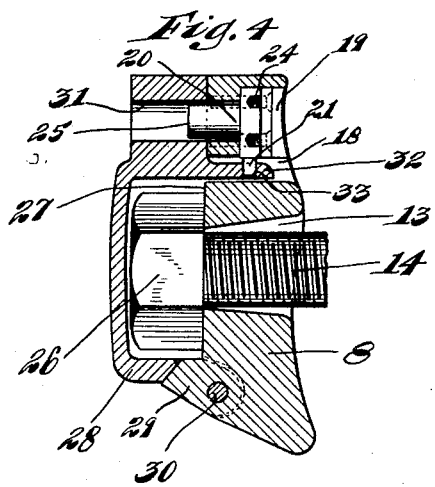
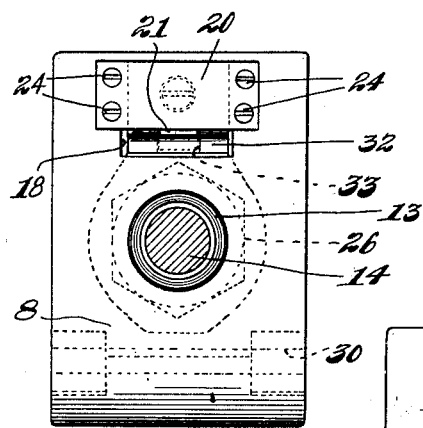
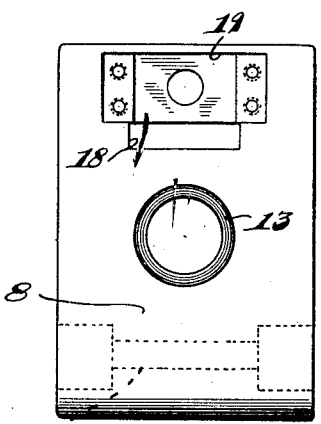
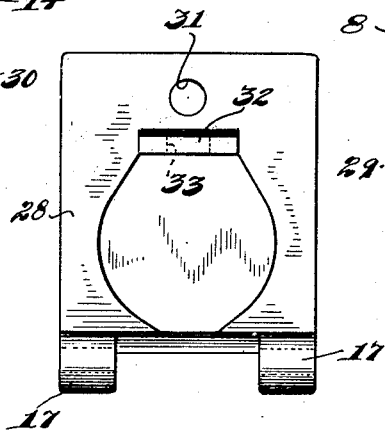
Witnesses:
C. E. Wessels
Inventor:
Samuel H. Ray,
By Joshua R. H. Potts
his Attorney.

Patented Sept. 17, 1929

1,728,253

UNITED STATES PATENT OFFICE

SAMUEL H. RAY, OF CHICAGO, ILLINOIS

RIM-LOCKING DEVICE

Application filed November 4, 1926. Serial No. 146,071.

My invention relates to rim locking devices, designed especially for use in connection with motor vehicle wheels to secure the wheel rims and tires in place; and the main object of my invention is the provision of a novel key operated lug lock for securing the wheel rim against surreptitious removal and hence to prevent the theft of the tire.

Another object of my invention is to provide a device of this character which will be of a simple, efficient and durable construction, and which will be convenient in use and inexpensive to manufacture.

Other objects will appear hereinafter.

The invention consists in the combinations and arrangements of parts hereinafter described and claimed.

The invention will be best understood by reference to the accompanying drawings, forming a part of this specification and in which, Fig. 1 represents a side elevational view of a motor vehicle showing my improved lug lock applied thereto;

Fig. 3 represents a top plan view of the front or face of the device;

Fig. 4 is a longitudinal section taken on the line 4—4 of Fig. 3;

Fig. 5 represents a plan view of the back or rear of the device and showing a fastening bolt in section;

Fig. 6 is a plan view of the back or rear of the lug body proper with the fastening bolt and enclosing cap removed; and Fig. 7 represents a plan view of the inside face of the inclosing cap.

Figure 1:
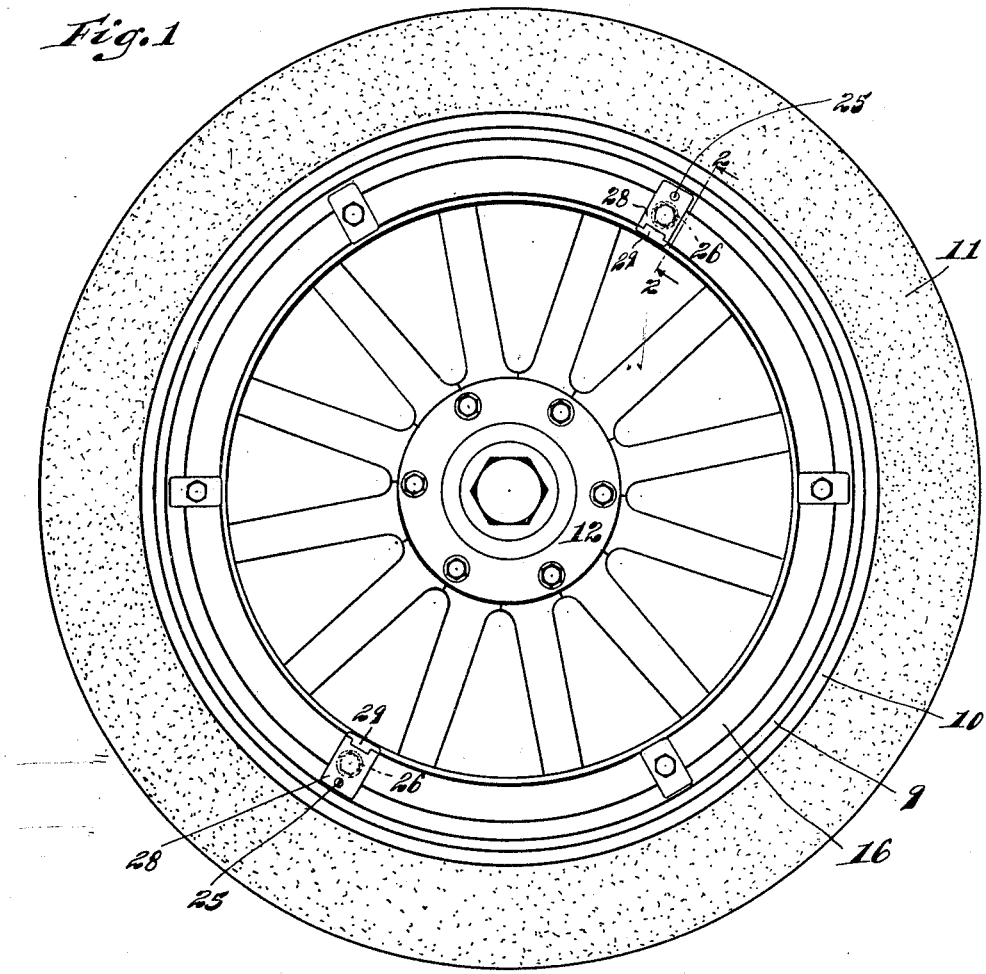
Figure 2:
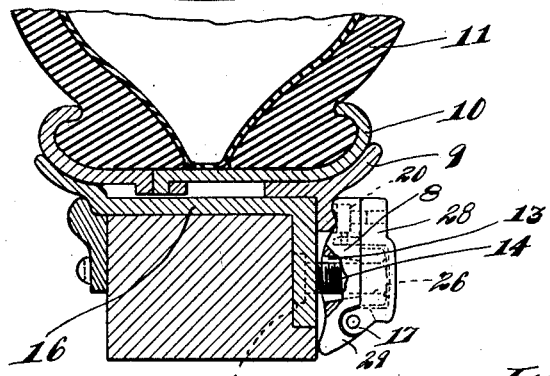
Fig. 2 represents a cross section on an enlarged scale, taken on the line 2—2 of Fig. 1.

The preferred form of construction as illustrated in the accompanying drawings comprises a lug body 8 of any suitable form and outline adapted to secure the ordinary demountable rim 9, tire holding flange 10 and tire 11 in place in the usual way upon the wheel 12. The lug body 8 is provided with a central transverse opening 13 for the reception of the usual fastening bolt 14 having a head end 15, embedded in or secured with a felly ring 16. At one side of the opening 13, said lug body 8 is provided with two spaced apart hinge knuckles 17 while at the opposite side of the opening 13 there is a way or keeper opening 18, beyond which is a cavity 19 in which is located a suitable key-operated lock 20 furnished with a locking bolt 21 adapted to be extended into the keeper opening 18. By preference, the lock 20 is secured to a plate 22 having flanges 23 through which suitable screw elements 24 are passed into the lug body. As best illustrated in Fig. 4, the lock 20 is secured in such position that the end 25 of its key receiving barrel projects beyond the side of the lug body.

26 designates a nut which is screw threaded upon the end of the bolt 14 and against a seat 27 provided on the side of the lug body. For inclosing the nut 26 I provide a cap 28 which is made at one end with a hinge knuckle 29 adapted to fit between the hinge knuckles 17 and to receive a connecting hinge pin 30. Said cap 28 is also made with a key-way 31 for the reception of the protruding end 25 of the key-operated barrel as clearly shown in Fig. 4. The construction of the inclosing cap 28 also includes a tongue 32 which is adapted, when the cap is closed against the lug body, to enter the keeper opening 18; and said tongue 32 is itself provided with a keeper opening 33 for the reception of the locking bolt 21.

From what has been said it will be evident that in order to apply my improved locking device to the vehicle wheel, the cap must be unlocked from the lug body and swung into open position so that the lug body can be slipped upon the tie bolt 14 and the nut 26 applied. Thereupon the cap is closed and the lock manipulated so as to extend the locking bolt 21 into the tongue. By this arrangement, the wheel rim cannot be removed except by the party possessing the key which commands the lock incorporated in the locking device.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A rim locking device comprising a lug body and a hinged cap arranged to retain a securing device between them, said securing device including a lock mounted within a socket provided on said lug and adapted to cooperate with a keeper in said cap, said cap being hinged to the lug body and serving to inclose the lock while permitting access thereto from the front of said lug, substantially as described.

2. In combination a lug body, a cap for the lug body, means adapted to hold the lug body in place, entering the lug body and held between the lug body and cap, said means including a key-operated locking device bolted on said lug body and a cooperating keeper on said cap receiving a tongue of said locking device, substantially as described.

3. A rim locking device comprising a lug body having separate openings, one of said openings providing a way for the passing of the shank of a tie bolt, the other of the said openings constituting a keeper opening; a cap arranged to co-operate with said body to inclose and retain the head of the tie bolt; a tongue on said cap enterable in said keeper opening; and means associated with said body adapted to be interlocked with said tongue, substantially as described.

In testimony whereof I have signed my name to this specification.

SAMUEL H. RAY.